United States Patent [19]

Tanaka

[11] Patent Number: 5,464,288

[45] Date of Patent: Nov. 7, 1995

[54] LINEAR MOTION ROLLING GUIDE UNIT

[75] Inventor: Kazuhiko Tanaka, Seki, Japan

[73] Assignee: Nippon Thompson Co., Ltd., Tokyo, Japan

[21] Appl. No.: 354,816

[22] Filed: Dec. 8, 1994

[30] Foreign Application Priority Data

Dec. 15, 1993 [JP] Japan .................... 5-342272

[51] Int. Cl.⁶ .................... F16C 29/06; F16C 33/72
[52] U.S. Cl. .................... 384/15; 384/45
[58] Field of Search .................... 384/15, 43, 44, 384/45

[56] References Cited

U.S. PATENT DOCUMENTS

| | | | |
|---|---|---|---|
| 5,087,130 | 2/1992 | Tsukada | 384/15 |
| 5,209,575 | 5/1993 | Ohtake | 384/15 |
| 5,360,271 | 11/1994 | Agari | 384/15 |
| 5,362,155 | 11/1994 | Ichida | 384/15 |

FOREIGN PATENT DOCUMENTS 6-20923  3/1994  Japan .

*Primary Examiner*—Thomas R. Hannon
*Attorney, Agent, or Firm*—Browdy and Neimark

[57] ABSTRACT

In this linear motion rolling guide unit, the attaching and detaching of underseals to and from a slider can be done easily, and the underseals are housed in the grindstone spaces in a casing and does not project from the lower surface of the slider. Therefore, a height measured from the lower surface of the slider in a track rail-saddling-on state to a lower end of the track rail can be secured sufficiently. End caps have projections provided with locking portions. The projections of the end caps are fitted into insert bores formed in elastic members of the underseals with the locking portions of the projections engaged with edge portions of locking bores in core metal members of the underseals as edge portions of the insert bores are elastically deformed.

9 Claims, 4 Drawing Sheets

LINEAR MOTION ROLLING GUIDE UNIT

BACKGROUND OF THE INVENTION:

1. Field of the Invention

This invention relates to a linear motion rolling guide unit in which a casing-carrying slider is formed so that it can be moved slidingly on a track rail via rolling elements.

2. Description of the Prior Art

In a conventional linear motion rolling guide unit, a slider saddling and moving slidingly on a track rail has a casing, end caps fixed to both ends of the casing, side seals fixed to both end surfaces of the end caps, underseals fixed to a lower surface of the slider, and rolling elements rolling on raceways formed between raceway grooves provided in the track rail and those provided in the casing.

A four-row endless linear motion rolling guide unit is known as a conventional linear motion rolling guide unit described above. The four-row endless linear motion rolling guide unit will now be described with reference to FIGS. 5 and 6. FIG. 5 is a partially cutaway view in perspective of an example of the four-row endless linear motion rolling guide unit, and FIG. 6 a sectional view showing an example of the condition of cylindrical rollers inserted rollably between a track rail and a slider in the four-row endless linear motion rolling guide unit of FIG. 5.

The four-row endless linear motion rolling guide unit has a track rail 1, a slider 7 saddling on the track rail 1 so that the slider can be moved relatively to and slidingly on the track rail 1, and rolling elements 6 interposed rollably between the track rail 1 and slider 7. The track rail 1 is provided in its both lengthwise extending side wall surfaces 2 with grooves 5 constituting raceway surfaces 3. The upper and lower edge portions of the raceway surfaces 3 of the grooves 5 in the track rail 1 from inclined surface portions. In order to have the slider 7 straddle the track rail 1, it has a casing 8 provided with wings 4 defining recesses 9, and end caps 22 fixed to both of the lengthwise end surfaces of the casing 8. In order to seal the clearances between the track rail 1 and end caps 22 during a sliding movement of the slider 7 on the track rail 1, side seals 36 are fixed to the end surfaces of the end caps 22. In order to seal the clearances between the track rail 1 and casing 8 and end caps 22, underseals 26 are fixed to a lower surface of the slider 7 with bolts 35 so that the underseals 26 are also fastened to the casing 8 or end caps 22.

The portions of the recesses 9 in the casing 8 which correspond to the upper and lower raceway surface portions 3 of the track rail 1 are provided with upper and lower raceway surfaces 10. Locking recesses 12 are provided between the upper and lower raceway surfaces 10 of the casing 8. Retainer members 18 having at both of the longitudinal side edge portions thereof locking edges 19 for retaining rolling elements 6 on the casing 8 are engaged with the locking recesses 12 in the casing 8. The retainer members 18 are fixed to the casing 8 by bolts 20 inserted into bolt inserting bores 13 formed in the casing 8, and parts of the retainer members 18 are loosely fitted in the grooves 5 in the track rail 1.

Owing to the above-described construction, the four-row endless linear motion rolling guide unit has load raceways allowing a total of four rows of rolling elements to roll on both side surfaces of the track rail 1, i.e., two rows of rolling elements on each side surface of the track rail 1, and comprising the upper and lower raceway surfaces 3 of the track rail 1 and the upper and lower raceway surfaces 10 of the casing 8. The casing 8 is provided with return passages 14, and the end caps 22 direction conversion passages 21 which allows the load raceways to communicate with return passages 14. Accordingly, the load raceways, direction conversion passages and return passages 14 constitute two endless roller circulating passages. These endless circulating passages are formed so as to cross each other without interfering with each other. When the slider 7 is moved slidingly on the track rail 1, the rolling elements 6 roll circulatingly in the endless circulating passages.

Although examples of rolling elements comprising cylindrical rollers are illustrated in this linear motion rolling guide unit, rolling elements consisting of balls have been developed. In this linear motion rolling guide unit, underseals are attached to the lower surface of the slider for the purpose of effecting the sealing of the contact surfaces of the track rail and casing and end caps. What is disclosed in Japanese Utility Model Laid-Open No. 20923/1994 will now be described as an example of such a linear motion rolling guide unit with reference to FIGS. 7 and 8. FIG. 7 is an exploded view in perspective showing the relation between an end cap and an underseal in the linear motion rolling guide unit, and FIG. 8 a sectional view of an underseal fixing structure in the linear motion rolling guide unit shown in FIG. 7. In FIGS. 7 and 8, the parts the construction and effects of which are identical with those of the above-described conventional linear motion rolling guide unit are designated by the same reference numerals, and the duplication of descriptions thereof is omitted.

In the linear motion rolling guide unit shown in FIGS. 7 and 8, an end cap 22 is provided with a projection 23 extending from a lower surface thereof in the longitudinal direction, and this projection 23 has longitudinally extending locking portions 24. Locking claws 29 are formed by longitudinal edge portions of a locking bore 28 formed so as to extend longitudinally in a core metal member 27 of the underseal 26, and the projection 23 is engaged with the locking claws 29 by elastically deforming the former, whereby the underseal 26 is secured to the end cap 22.

In the linear motion rolling guide units shown in FIGS. 5–8, each underseal 26 is fixed to the lower surface of the end cap 22 by a bolt 35 or a projection 23. Regardless of the method of fixing the underseal 26 to the end cap 22, the underseal 26 is fixed to the lower surface of the casing 8 or end cap 22 so that a lip portion 31 or a contacting portion 32 of an elastic member 30 of the underseal 26 closely engages the track rail 1, end cap 22 and casing 8. The whole or a part of the underseal 26 is positioned below the lower surface of the end cap 22.

In the linear motion rolling guide unit shown in FIGS. 7 and 8, the end cap 22 is provided with a projection 23 extending longitudinally from the lower surface thereof, and the locking claws 29 formed at the longitudinal edge portions of the locking bore 28 provided so as to extend longitudinally in the core metal member 27 of the underseal 26 are engaged with the locking portions 24 provided on the projection 23 as mentioned above. Therefore, in this linear motion rolling guide unit, the projection 23 is fitted in the locking bore 28 by elastically deforming the former, and the locking portions 24 of the projection 23 are engaged with the locking claws 29 of the locking bore 28, whereby the underseal 26 is attached to the end cap 22. Consequently, the projection 23 requires an elasticity for fitting itself in the locking bore 28, and a rigidity for locking the locking claws 29 by the locking portions 24, so that the manufacturing of these parts becomes complicated and very expensive.

The projection 23 formed on the lower surface of the end cap 22 of this linear motion rolling guide unit is elastically deformed when the underseal 26 is fixed or removed, so that it is liable to be broken. Moreover, since the projection 23 is formed integrally with the end cap 22, it is necessary that the end cap 22 as a whole be replaced even when the projection 23 only is broken.

FIG. 9 is a schematic illustration showing a linear motion rolling guide unit similar to that of FIG. 6. As shown in FIG. 9, a height H1 measured from a lower surface of a slider 7 to that of a track rail 1 with the slider 7 straddling the track rail 1 in a conventional linear motion rolling guide unit, i.e. a satisfactory distance between a base 37 on which the track rail 1 is fixed and the lower surface of the slider 7 cannot be secured. Therefore, limitations are placed on the designing of the construction of the slider 7, i.e., the degree of freedom of designing the slider 7 is restricted.

SUMMARY OF THE INVENTION

A primary object of the present invention is to solve these problems, and provide a linear motion roller guide unit in which an undercut portion is formed in an end cap correspondingly to a grindstone space formed in a casing, a projection being provided on the undercut portion, an underseal being housed in the grindstone space, the underseal being fixed to the end cap without imparting an excessive load to the projection of the underseal, a sufficient height measured from a lower surface of the slider saddling on a track rail to a lower end of the track rail being secured without projecting the underseal from the lower surface of the slider.

Another object of the present invention is to provide a linear motion rolling guide unit having a track rail provided with raceway surfaces on both of longitudinally extending side walls thereof; a casing provided with raceway surfaces opposed to those of the track rail, saddling on the track rail and capable of being moved slidingly and relatively thereto; end caps fixed to both of the longitudinal ends of the casing; rolling elements adapted to roll between the mentioned opposed raceway surfaces; and underseals comprising elastic members adapted to seal clearances between the track rail and slider, and core metal members fixed to the elastic members, characterized in that the casing has grindstone spaces with inclined surfaces below the portions of the casing which are close to the track rail, the underseals being housed in the grindstone spaces, downwardly extending projections being provided on lower surfaces of the end caps, first locking bores being formed in both end portions of the core metal members of the underseals with second locking bores formed in both end portions of the elastic members, the first and second locking bores being formed in a partially non-aligned state so that edge portions of the first locking bores project into the inner side of the second locking bores with edge portions of the second locking bores projecting into the inner side of the first locking bores, the projections of the end caps being fitted in the first and second locking bores in the underseals, locking portions of these projections being engaged with the edge portions of the first locking bores.

The portions of the lower surfaces of the end caps which are on the side of the track rail are undercut to form inclined surfaces, on which the mentioned projections are provided. These projections are provided at their free end parts with the locking portions extending in the longitudinal direction of the end caps. These locking portions extend away from the casing or toward the casing.

The core metal members of the underseals are provided in positions in which they contact the end caps. The locking bores in the elastic members are not aligned with those in the core metal members, i.e., the former partially overlaps the latter.

In order to fix the underseals to the end caps, the edge portions, which project to the inner side of the first locking bores, of the second locking bores of the elastic members are elastically deformed and inserted into the first and second locking bores, and these elastically deformed edge portions are restored to their original forms, whereby these locking portions are engaged with the edge portions of the first locking bores, which project from the second locking bores, of the core metal members.

The underseals are positioned with the second locking bores, i.e. insert bores in both end portions of the elastic members and the first locking bores, i.e. locking bores in both end portions of the core metal members staggered from each other in the longitudinal direction, and with the edge portions of the insert bores projected to the inner side of the locking bores. Therefore, when the locking portions of the projections are inserted into and pressed against the locking bores on one side formed in the core metal members, for the purpose of fixing the underseals to the end caps, the edge portions, which are positioned on the inner side of the locking bores, of the elastic members are elastically deformed, and the locking portions of the projections are inserted into the other locking bores with the elastic members left in the mentioned condition.

During this time, the edge portions of the elastic members of the underseals are restored to their original forms, so that the edge portions of the insert bores are elastically pressed against the rear surfaces of the locking portions of the projections and engaged therewith, whereby the underseals are positioned in the longitudinal direction with respect to the end caps. The locking claws of said locking bores then engage the locking portions of the projections, whereby the underseals are fitted firmly in the end caps.

The underseals are fixed to the end caps so that the underseals are housed in grindstone spaces formed in the portions of the track rail which are opposed to the lower end of the casing so as to polish the raceway surfaces of the casing, the underseals being formed so that the underseals do not project downward from the lowermost surfaces of the end caps. Accordingly, a distance between the lower surface of the slider in a track rail-saddling-on state and the lower end of the track rail, in other words, a height H1 measured from the lower surface of the slider to the base can be sufficiently secured.

When the locking bores formed in the core metal members are aligned with and pressed against the projections of the end caps during an operation for fixing the underseals to the end caps, the edge portions, which are positioned on the inner side of the locking bores, of the insert bores are elastically deformed, and the projections of the end caps and the locking portions of the underseals are inserted into the locking bores and insert bores. During the attaching and detaching of the underseals to and from the end caps, the projections provided on the lower surfaces of the end caps are not elastically deformed.

At the same time, since the edge portions of the insert bores engage the rear surfaces of the locking portions of the projections, the positioning of the underseals in the longitudinal direction is effected with respect to the end caps, and the locking claws of the locking bores engage in this condition the locking portions of the projections, whereby the underseals are fitted firmly in the end caps.

A highly reliable and stable fixing structure capable of combining and separating the end caps with/from underseals very easily can be provided, and the cost of manufacturing the linear motion rolling guide unit is low. The construction is simple, and the manufacturing cost can be reduced. An amount of variation in the longitudinal direction of the relative lengths of the underseals and casing can be offset by the elastic deformation of the edge portions of the elastic members.

Therefore, the manufacturing of the projection-carrying end caps can be done easily, and the strength thereof can be improved by forming these projections to larger dimensions. This can prevent the projections from being easily broken, and enables the lifetime of the end caps to be prolonged.

DESCRIPTION OF THE PREFERRED EMBODIMENTS

Figure 1:
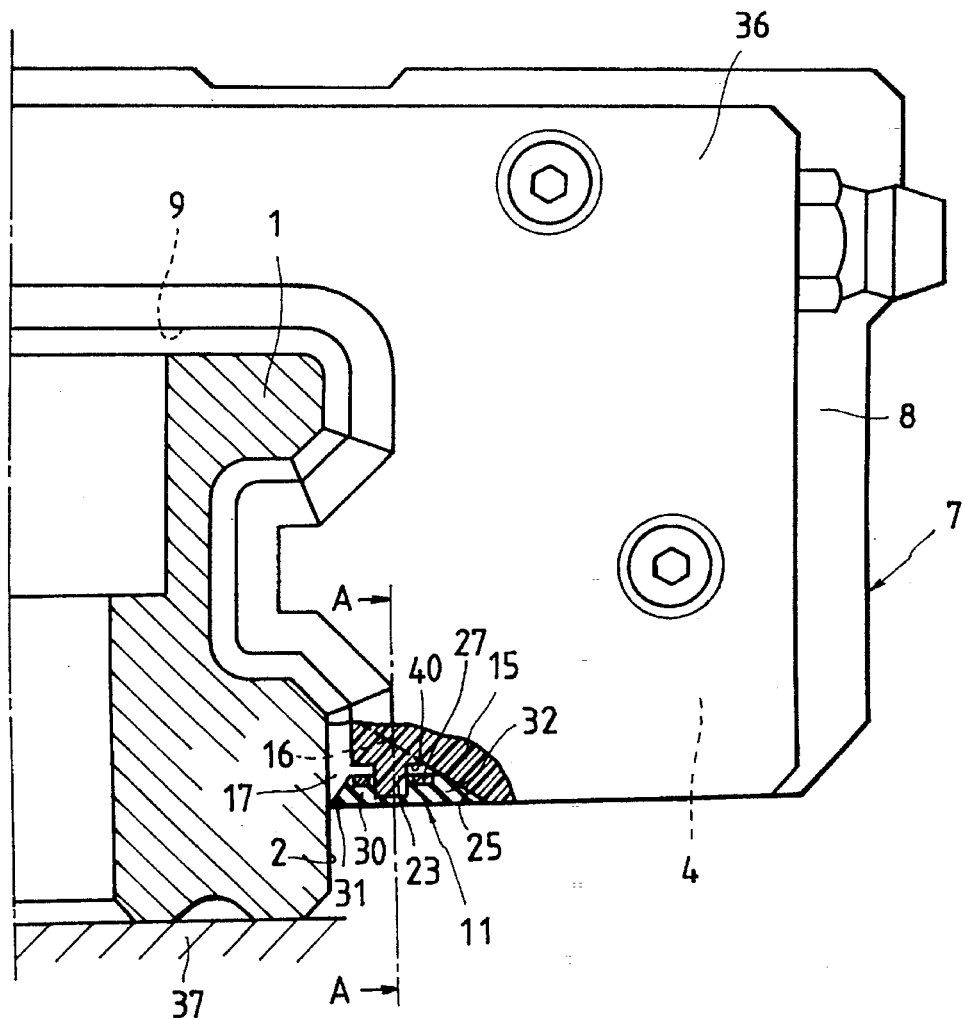
FIG. 1 is a partially cutaway view in side elevation of an embodiment of the linear motion rolling guide unit according to the present invention.
Figure 2:
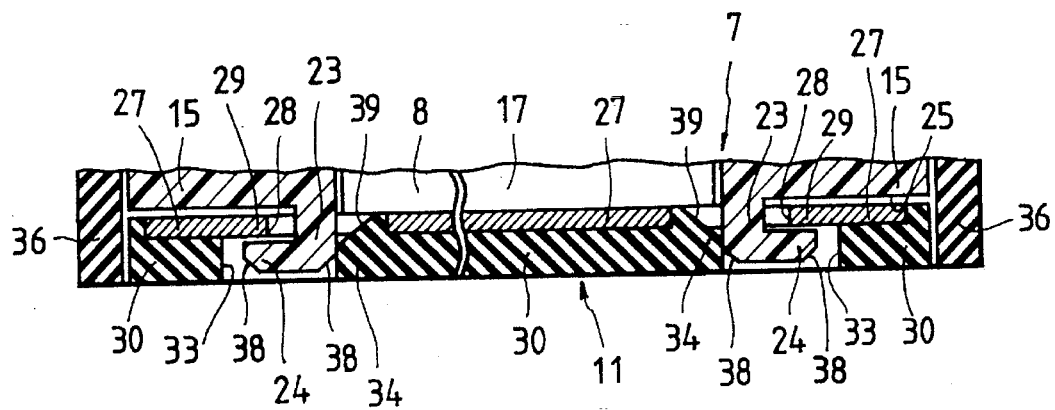
FIG. 2 is a sectional view taken along the line A—A in FIG. 1 and showing a fixing structure for combining an end cap with an underseal in the linear motion rolling guide unit of FIG. 1.

Embodiments of the linear motion rolling guide unit according to the present invention will now be described with reference to FIGS. 1 and 2. This linear motion rolling guide unit has basically the same construction as the linear motion rolling guide unit shown in FIGS. 5–9, and is characterized by fixing structures for underseals and end caps. Accordingly, the parts which are shown in FIGS. 1 and 2, and which have the same construction and effects as the parts shown in FIGS. 5–9, are designated by the same reference numerals, and the duplication of the descriptions thereof is omitted.

Figure 3:
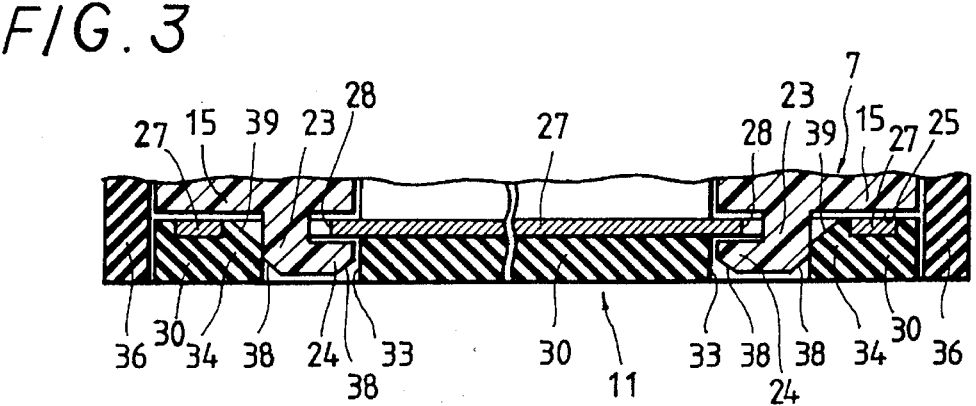
FIG. 3 is a sectional view taken along a line corresponding to the line A—A in FIG. 1, and showing a fixing portion of an underseal in another embodiment of the linear motion rolling guide unit.
Figure 4:
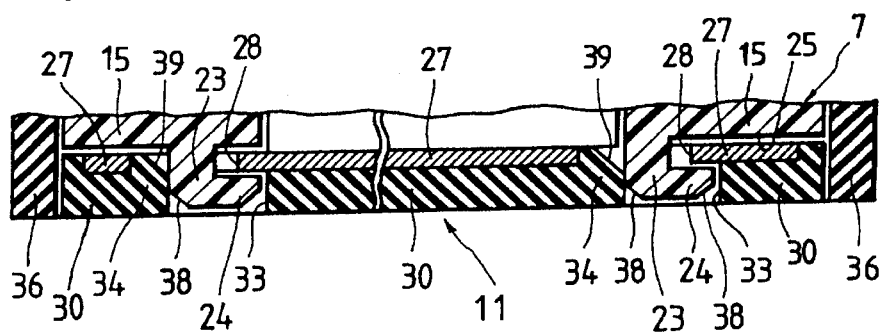
FIG. 4 is a sectional view taken along a line corresponding to the line A—A in FIG. 1, and showing a fixing portion of an underseal in still another embodiment of the linear motion rolling guide unit.
Figure 5:
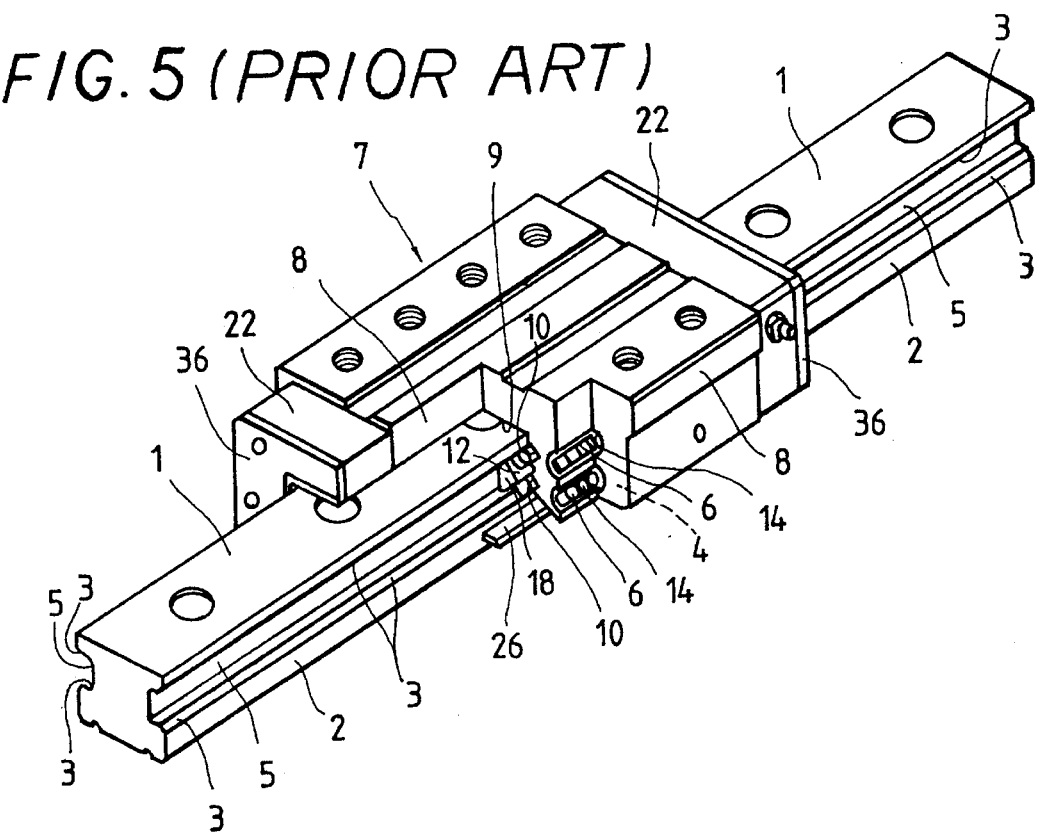
FIG. 5 is a partially cutaway view in perspective of an example of a four-row endless linear motion rolling guide unit.
Figure 6:
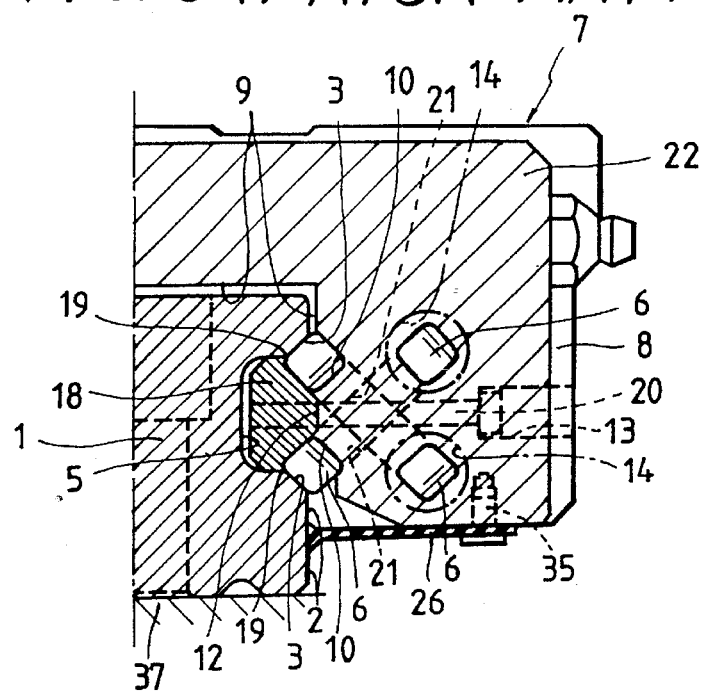
FIG. 6 is a sectional view of an example of the condition of a plurality of cylindrical rollers interposed rollably between a track rail and a slider in the four-row endless linear motion rolling guide unit of FIG. 5.
Figure 7:
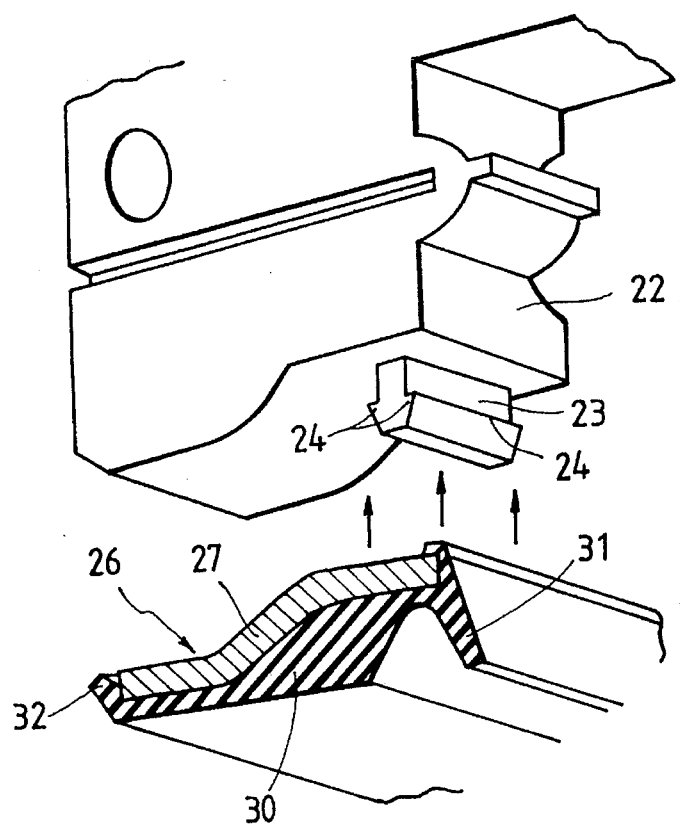
FIG. 7 is an exploded view in perspective showing the relation between an end cap and an underseal in the linear motion rolling guide unit.
Figure 8:
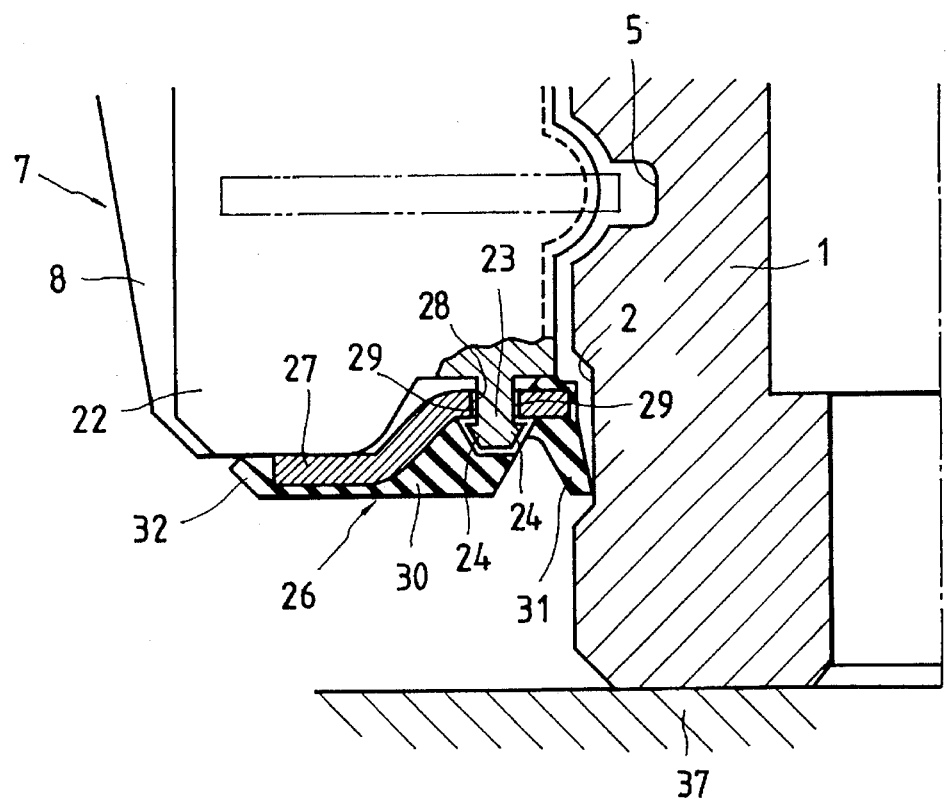
FIG. 8 is a sectional view of an underseal fixing structure in the linear motion rolling guide unit of FIG. 7.
Figure 9:
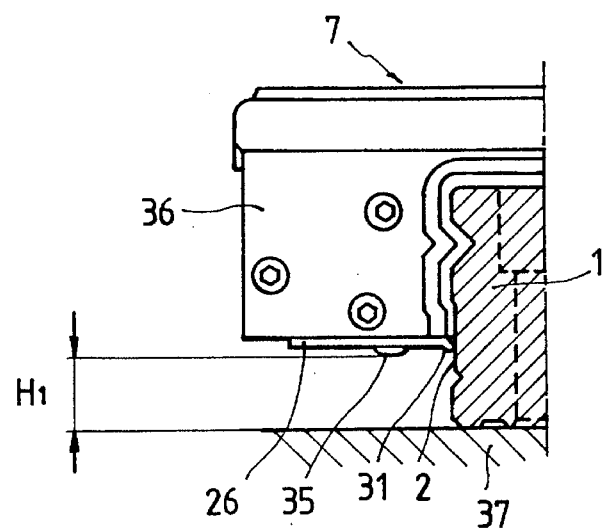
FIG. 9 is a schematic illustration of a linear motion rolling guide unit similar to that of FIG. 6.

In the descriptions of the linear motion rolling guide units according to the present invention, Figs. 5 and 6 are also referred to in addition to FIGS. 1–4. This linear motion rolling guide unit comprises of a track rail 1 provided in both of the longitudinal side wall surfaces thereof with recesses 5 which form upper and lower raceway surfaces 3, and a slider 7 saddling on the track rail 1 and capable of being moved slidingly and relatively to the track rail 1. The slider 7 has a casing capable of being moved slidingly and relatively to the track rail 1, end caps 15 fixed to both of the longitudinal ends of the casing 8, and a plurality of rolling elements 6 rolling between opposed raceway surfaces 3, 10.

The casing 8 is provided on the portions of thereof which are opposed to the raceway surfaces 3 of the track rail 1 with upper and lower raceway surfaces 10, and between these raceway surfaces 10 with locking recesses 12. Retaining members 18 for retaining the rolling elements 6 are engaged with the locking recesses 12, and fixed by bolts 20. Each of the end caps 15 is provided with direction conversion passages 21 establishing communication between a load raceway for the rolling elements and return passages 14 and adapted to convert the rolling direction of the rolling elements 6. The end case 22 are fixed to both end surfaces of the casing 8 by screws inserted through a plurality of screw holes.

This linear motion rolling guide unit is characterized mainly in that underseals 11 are inserted into grindstone spaces formed in the casing 8 and fixed to the end caps 15. The grindstone spaces 17 are defined by inclined surfaces 16 formed by inwardly cutting the parts of wing portions 4 defining recesses 9 in the casing 8 which are on the side of the side surfaces of the track rail 1. The grindstone spaces 17 are spaces in which grindstones (not shown) are moved reciprocatingly and relatively to the casing 8 so as to grind the raceway surfaces 10 of the casing 8.

The end caps 15 are provided on their lower surfaces with downwardly extending projections 23, at the free end parts of which locking portions 24 extending in the longitudinal direction of the end caps 15 are provided. Core metal members 27 of the underseals 11 are provided with locking bores (first locking bores) 28 in both end portions thereof. Elastic members 30 of the underseals 11 are provided with second locking bores, i.e. insert bores 33 in both end portions thereof. The projections 23 of the end caps 15 are formed so that they are fitted in the locking bores 28 and insert bores 33.

The parts of the lower surfaces of the end caps 15 which are on the side of the track rail are provided with fixing portions formed by undercutting these parts correspondingly to the inclined surfaces 16 of the casing 8 as shown in FIG. 1. The fixing portions of the end caps 15 consist of inclined surfaces opposed to the inclined surfaces of the grindstone spaces 17 and fixing surfaces 40 which the underseals 11 contact closely. The fixing surfaces of the end caps 15 are provided with the projections 23. The projections 23 provided on the portions of the lower surfaces of the fixing portions of the end caps 15 which are on the side of the casing 8 are formed so that they are fitted in the locking bores 28 and insert bores 33. The projections 23 are provided at their free end parts with locking portions 24 bent so as to extend away from the casing 8. The free end parts of the lower surfaces of the projections 23 and locking portions 24 are chamfered 38 as shown in Fig. 2, in such a manner that the projections 23 and locking portions 24 are fitted easily in the locking bores 28 and insert bores 33.

The underseals 11 comprise core metal members 27 formed out of a metal material, such as steel, and elastic members 30 formed out of an elastic material, such as a plastic fastened to the core metal members 27. The core metal members 27 are provided with locking bores 28 in which the projections 23 extending from the lower surfaces of the end caps 15 can be fitted when the underseals 11 are fixed to the end caps 15 on both sides of the casing 8. The elastic members 30 are provided with lips 31 capable of contacting in a sealed state both of the longitudinal side wall surfaces 2 of the track rail 1, and lips, contact portions 32 capable of contacting in a sealed state the recesses 16 in the casing 8 and the inclined surfaces 25 of the end caps 15. The elastic members 30 are also provided with insert bores 33 into which the locking portions 24 of the projections 23 extending from the lower surfaces of the end caps 15 are inserted. The insert bores 33 are formed in the portions of the elastic members 30 which are offset from the locking bores 28 in the core metal members 27 toward both of the longitudinal end portions of the elastic members 30, and edge portions 34 of the insert bores 33 are necessarily positioned on the inner side of the locking bores 28. In other words, the core metal members 27 and elastic members 30 are fixed to each other by setting parts of the locking bores 28 and insert bores 33 in a non-aligned, i.e. staggered state so that the edge portions of the locking bores 28 project into the inner side of the insert bores 33 with the edge portions 34 of the insert bores 33 projecting into the inner side of the locking bores 28.

Both of the longitudinal edge portions of the locking bores 28 formed in the core metal members 27 have parts to which the elastic members 30 are not fixed as shown in FIG. 2, and these parts constitute locking claws 29 with which the locking portions 24 at the free ends of the projections 23 extending from the lower ends of the end caps 15 are engaged. Accordingly, the projections 23 of the end caps 15 are fitted in the locking bores 28 and insert bores 33 in the underseals 11, and the locking portions 24 of the end caps 15 are engaged with the edge portions, i.e. locking claws 29 of the locking bores 28. Moreover, the underseals 11 are fixed to the end caps 15 with the underseals 11 housed in the grindstone spaces 17.

When the elastically deformed edge portions 34, which are positioned in the locking bores 28 formed in the core metal members 27 and comprise the elastic members 30, of the insert bores 33 are restored to their original forms, they contact the rear surfaces of the locking portions 24 provided at the free ends of the projections 23 extending from the lower surfaces of the end caps 15. The upper end parts of the edge portions 34 of the insert bores 33 are chamfered 39 as shown in FIG. 2, and the inner end parts of these edge portions 34 are formed to a smaller thickness, whereby the elastic force for the elastic deformation thereof is reduced, in such a manner that the projections 23 and locking portions 24 are fitted easily in the locking bores 28 and deformed elastically with ease.

A method of fixing the underseals 11 to the slider 7 in this linear motion rolling guide unit will now be described. One locking bore 28 in the underseal 11 is set opposed to the locking portion 24 of the projection 23 extending from the lower end of an end cap 15, and the underseal 11 is moved toward the projection 23. Consequently, the locking portion 24 enters the locking bore 28 formed in the core metal member 27, and impinges upon the edge portion 34 of the insert bore 33. When the underseal 26 is further pressed toward the projection 23, the edge portions 34 formed out of an elastic material is elastically deformed, and the locking portion 24 of the projection 23 is fitted in the insert bore 33. The locking portion 24 of the projection 23 fitted in the insert bore 33 receives a resilient force of the edge portion 34 on the rear surface thereof, and is moved to a position shown in FIG. 2 the locking portion 24 being then engaged with the locking claw 29 of the locking bore 28 formed in the core metal member 27.

The opposite end portion of the underseal 11 is then fixed to the end cap 15. In this case, the above-described procedure is also followed. In the position close to the projection 23 formed at the lower end of the end cap 15 and engaged with the locking bore 28 and insert bore 33 in the underseal 11 which is on the opposite side of the edge portion 34, a space in which the underseal 11 and end cap 15 can be moved relatively to each other is formed as shown in FIG. 2. When the underseal 11 is drawn toward the projection 23 of the end cap 15 by a distance corresponding to the width of this space, the other locking bore 28 in the underseal 11 is moved to a position in which this locking bore 28 is opposed to the locking portion 24 of the other projection 23. When the locking bore 28 and insert bore 33 are then fitted over the projection 23 with the elastically deformed edge portions 34 of the elastic members 30 restored to their original forms i.e., released, the locking portions 22 are engaged with the insert bores 33, so that the underseals 11 are fixed to the end caps 15.

As described above, the edge portions 34 of the two insert bores 33 formed in the underseals 11 fixed to the end caps 15 contact the rear surfaces of the locking portions 24 of the projections 23 formed on the end caps 15, whereby the longitudinal positioning of the underseals 11 is achieved. The underseals 11 are fixed more reliably by side seals 36 attached to both of the longitudinal ends of the slider 7. As shown in FIG. 1, the underseals 11 can be fixed to the end caps 15 so that the underseals 11 are held in the portions of the grindstone spaces 17 defined by the inclined surfaces 16 of the casing 8 formed so as to grind the raceway surfaces 10 of the casing 8 which are above the lowermost surfaces of the slider 7.

In order to remove the underseals 11 from the end caps 15, the underseals 11 are moved longitudinally and relatively to the end caps 15, and the projections 23 of one end cap 15 are then removed from the locking. The bores 28 and insert bores 33 in one underseal 11. projections 23 of the other end cap 15 are then removed from the locking bores 28 and insert bores 33 in the other underseal 11, so that the underseals 11 can be removed from the end caps 15.

FIG. 3 is a sectional view of a fixing portion in which an underseal is fixed to a lower end of an end cap in another embodiment of the linear motion roller guide unit. In the previously-described embodiment, the locking portions 24 of the projections 23 extending from the lower ends of the end caps 15 fixed to both of the longitudinal ends of the casing 8 are bent in the opposite directions, i.e., toward the sides of fixing of side seals 36. On the other hand, in the embodiment shown in FIG. 3, locking portions 24 of projections 23 extending from lower ends of end caps 15 provided on both ends of a casing 8 are bent so that they face the casing 8. The remaining parts of this embodiment basically have the same construction and functions. Therefore, in FIG. 3, the parts the construction and effects of which are the same as those of the parts shown in FIG. 2 are designated by the same reference numerals, and the duplication of the descriptions thereof is omitted.

The projections 23 are formed closer to the centers of the end caps than to the end portions thereof which are on the side of the casing 8 so that free end surfaces of the locking portions 24 of the projections 23 formed on the lower surfaces of the end caps 15 becomes flush with the surfaces of the end caps 15 which are on the side of the casing 8. The positions of the locking bores 28 and insert bores 33 formed in the underseals 11 may be changed in accordance with design changes of these projections 23 and locking portions 24.

Although the linear motion rolling guide unit in this application is constructed as described above, it is not limited to those embodiments. For example, projections 23 may be formed at the end portions of the end caps 15 which are on the side of the casing 8 so that the free ends of the locking portions 24 project toward the casing 8. In this linear motion rolling guide unit, the projections 23 may be bent so that the locking portions 24 extend in the same direction as shown in FIG. 4. In this structure, both end portions of the underseals 11 can be fitted simultaneously to the projections 23 and locking portions 24 of the two end caps 15, so that an operation for fixing the underseals 11 can be carried out simply.

What is claimed is:

1. A linear motion rolling guide unit comprising:

a track rail provided with first raceway surfaces on both of longitudinal wall surfaces thereof, a slider saddling on said track rail so that said slider can be moved slidingly and relatively thereto, a casing provided with second raceway surfaces opposed to said first raceway surfaces of said slider, end caps fixed to both of longitudinal ends of said casing, rolling elements adapted to roll between said first and second raceway surfaces, and underseals comprising elastic members sealing clearances between said track rail and said slider and core metal members fixed to said elastic members, the parts of lower surfaces of said casing which are on the side of said track rail being provided with longitudinally extending inclined surfaces of grindstone spaces, in which underseals are provided, said end caps being provided on lower surfaces thereof with downwardly extending projections, at free ends of which locking portions extending in the longitudinal direction of said end caps are provided, first locking bores being provided in both end portions of said core metal members of said underseals with second locking bores provided in both end portions of said elastic members thereof, in which first and second locking bores said projections of said end caps are fitted, parts of said first and second locking bores being staggered from each other, i.e., non-aligned with each other so that edge portions of said first locking bores project into the inner side of said second locking bores with edge portions of said second locking bores projecting into the inner side of said first locking bores, said projections of said end caps being fitted in said first and second locking bores in said underseals with said locking portions of said projections engaged with said edge portions of said first locking bores.

2. A linear motion rolling guide unit according to claim 1, wherein said projections of said end caps are provided with fixing portions formed by undercutting the parts of lower surfaces of said end caps which are on the side of said track rail.

3. A linear motion rolling guide unit according to claim 1, wherein said projection-carrying parts of the lower surfaces of said end caps are undercut and formed into said fixing portions, which comprise inclined surfaces opposed to said inclined surfaces of said grindstone spaces, and fixing surfaces to which said underseals are firmly fixed.

4. A linear motion rolling guide unit according to claim 1, wherein said locking portions at the free ends of said projections provided on said end caps extend away from said casing.

5. A linear motion rolling guide unit according to claim 1, wherein said locking portions provided on said projections of said end caps extend toward said casing.

6. A linear motion rolling guide unit according to claim 1, wherein free end portions of said projections of said end caps are chamfered.

7. A linear motion rolling guide unit according to claim 1, wherein said edge portions of said second locking bores formed in said elastic members of said underseals are chamfered so that said edge portions can be deformed elastically with ease.

8. A linear motion rolling guide unit according to claim 1, wherein said core metal members of said underseals are provided on the end cap-contacting side thereof.

9. A linear motion rolling guide unit according to claim 1, wherein said underseals are fixed to said end caps by elastically deforming said edge portions, which project into the inner side of said first locking bores, of said second bores in said elastic members, inserting said projections into said first and second locking bores, and restoring said elastically deformed edge portions to their original form, whereby said locking portions are engaged with said edge portions, which project from said second locking bores, of said first locking bores in said core metal members.

* * * * *